Dec. 26, 1967     T. N. HAIDEK ET AL     3,360,007

GAS PRESSURE AND VACUUM PULL CONTROL VALVE

Filed Aug. 2, 1965

THOMAS N. HAIDEK
LEWIS C. TAYLOR
          *INVENTORS.*

BY

*Robert K. Rhea*

AGENT

3,360,007
GAS PRESSURE AND VACUUM PULL CONTROL VALVE
Thomas N. Haidek, 1905 N. Portland 73107, and Lewis C. Taylor, 620 NW. 9th 73102, both of Oklahoma City, Okla.
Filed Aug. 2, 1965, Ser. No. 476,470
6 Claims. (Cl. 137—528)

The present invention relates to valves and more particularly to a combination gas pressure and vacuum pull control valve.

The principal object of the present invention is to provide a combination gas pressure control valve for use with anaesthetic and resuscitation equipment and a vacuum control valve for fluid removal during surgery or for other applications which require adjusting, controlling and reproducing pressure or vacuum control involving low to relatively high flows of gases in the plus or minus zero to fifty millimeter mercury pressure range.

Another object is to provide a valve of this class which may be manually "set" or adjusted and is automatic thereafter in the regulation of the pressure of gas flowing therethrough or in the regulation of vacuum pull.

A further object is to provide a control wherein a ball valve is movable between an open and closed position by the attraction of a permanent magnet.

Still another object is to provide a gas flow control valve having a normally closed relief port which opens to admit air, as a safety feature, by the "pull" of a patient's lungs in the event gas pressure within the valve falls below a predetermined minimum.

A further object is to provide a control valve which may be used with various types of existing anaesthetic machines.

The present invention accomplishes these and other objects by providing a tubular housing intersected by tubes and including valve and permanent magnet means for maintaining a desired anaesthetic gas pressure or vacuum pull.

Figure 1:
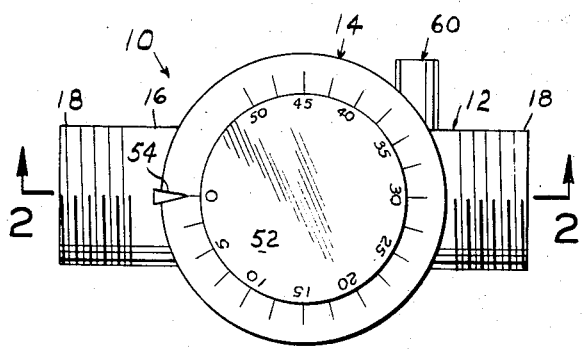
Figure 4:
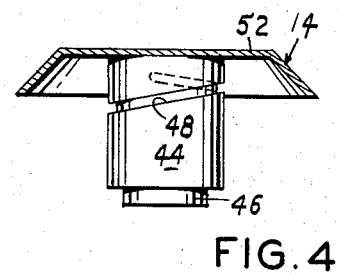
Figure 2:
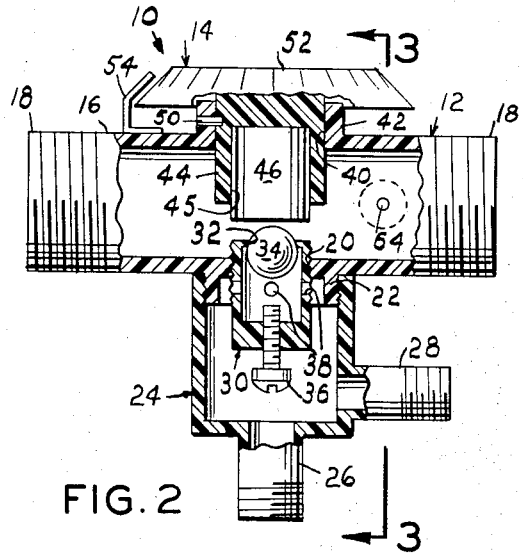
Figure 3:
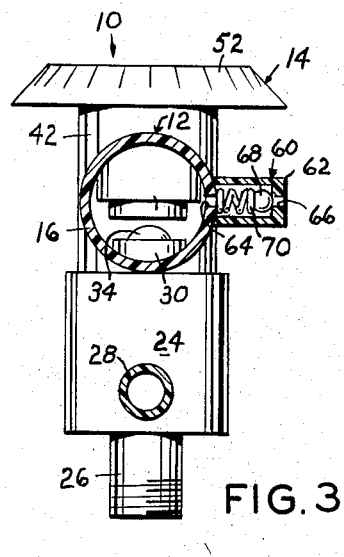

Other objects will be apparent from the following description when taken in conjunction with the accompanying single sheet of drawings, wherein:

FIGURE 1 is a top view of the valve;
FIGURE 2 is a vertical cross-sectional view, partially in elevation, taken substantially along line 2—2 of FIG. 1;
FIGURE 3 is a vertical cross-sectional view, partially in elevation, taken substantially along the line 3—3 of FIG. 2; and
FIGURE 4 is a side elevational view, partially in section, of the manual control means.

Like characters of reference designate like parts in those figures of the drawings in which they occur.

In the drawings:

The reference numeral 10 indicates the device, as a whole, comprising a housing 12 and control means 14, preferably formed of nonmagnetic material. The housing 12 is formed from a tubular member 16 having its opposing ends threaded, as at 18, or otherwise adapted for connection with fittings to be connected to a particular anaesthetic machine, not shown. One side of the tube 16 is provided with a threaded opening 20 surrounded by an externally threaded wall 22. A tube 24 is threadedly connected at one end, to the wall 22 in depending relation, as seen in FIGS. 2 and 3. The other end of the tube 24 is diametrically reduced, as at 26, and adapted to be connected to a vacuum source or line, not shown, for the purposes presently explained.

A relatively short threaded tube 28 is laterally connected to the wall of the tube 24 for communicating with the interior of the tube 24 and forming a vacuum line connection. A valve cage 30 is threadedly received by the threaded opening 20 and projects into the tube 16. The inward end of the cage 30 is provided with a seat 32 which receives a preferably steel ball valve 34. The other closed end of the cage 30 coaxially and threadedly receives an adjusting screw 36. The length of the adjusting screw 36, with respect to the cage 30, is such that the position of the ball valve 34 may be adjusted from a seated to an open position with respect to the valve seat 32. A plurality of openings or relief holes 38 are formed in the wall of the cage 30.

The wall of the tube 16 is provided with an opening 40, diametrically opposite the threaded opening 20, defined by an outstanding boss or circular wall 42. A mandrel 44 is closely received coaxially by the opening 40. The inwardly disposed end of the mandrel is provided with a concentric recess 45 which coaxially receives a cylindrical shaped permanent magnet 46. The outer wall surface of the mandrel is provided with an inclined groove 48 extending around a portion of the circumference thereof. A pin or screw 50, projecting through the wall of the boss 42, has its inner end portion slidably received by the groove 48 so that rotation of the mandrel 44 in one direction, moves the magnet 46 toward the ball valve 34 while rotation of the mandrel in the opposite direction moves the magnet 46 away from the ball valve 34.

A hand wheel 52, which is inverted cup-like in general configuration, is coaxially secured to the outwardly disposed end of the mandrel 44. The upper outer surface of the hand wheel 52 is scored and marked with indicia which, in combination with a pointer 54 secured to the housing 12, provides visual means for adjusting the space between the depending end surface of the magnet 46 and the ball valve 34.

A vacuum relief means 60 is connected to one side of one end portion of the tube 16. The vacuum relief means 60 includes a relatively small tubular member 62 connected at one end to the tube 16 around a small aperture 64. The other end of the tube 62 is closed and centrally drilled to form an axial opening 66. A second ball valve 68, positioned within the tube 62, normally maintains the aperture 66 closed by a spring 70 interposed between the second ball valve 68 and the inner end portion of the tube member 62.

*Operation*

When using the device as an anaesthetic gas pressure control the respective ends of the tube 16 are interposed between and connected to respective ends of anaesthetic supply tubes, not shown. The indicia marked or scored on the hand wheel indicate graduations from 0 mm. to 50 mm. mercury pressure or vacuum. Thus when the hand wheel is in its zero position, the magnet 46 is spaced a maximum distance away from and exerts less attraction for the ball valve 34 so that pressure within the tube 16 tends to push the ball valve 34 out of contact with its seat 32. Rotation of the hand wheel 52, in one direction, gradually moves the permanent magnet 46 toward the ball valve 34 to increase the magnetic attraction whereby a desired pressure of the gas flowing through the tube 16 is achieved. This is accomplished by a seating and unseating action of the ball valve 34 resulting in a balance between the gas pressure, and magnetic attraction for the valve 34. During this operation, in the event of failure of the anaesthetic machine, the second ball valve 68 will be drawn away from its seat 66, by the pull of the patient's lungs during breathing to admit air to the tube 16.

When using the device to control fluid removal by vacuum, one or both ends of the tube 16 remains unconnected. A source of vacuum is connected to the tube 26 and a drainage line is connected to the tube 28. Obviously these connections may be reversed if desired. When the hand wheel is in its zero position, the magnet 46 is spaced a maximum distance away from and exerts less attraction for the ball valve 34 so that reduced pressure within the tube 24 and cage 30 tends to pull the ball valve 34 out of contact with its seat 32. The hand wheel 52 is adjusted, as explained hereinabove, to increase the magnetic attraction for the ball valve 34 whereby a desired vacuum pull through the tube 24 is achieved. This is accomplished by a seating and unseating action of the ball valve 34 and a resulting balance between the vacuum pull and magnetic attraction for the ball valve 34.

Obviously the invention is susceptible to some change or alteration without defeating its practicability, and we therefore do not wish to be confined to the preferred embodiment shown in the drawings and described herein, further than we are limited by the scope of the appended claims.

We claim:

1. A gas pressure control valve, comprising: a tubular housing having ends adapted to be interposed in a gas conveying line, said housing having diametrically opposed openings in its wall; a mandrel slidably projecting into said tubular housing through one said opening; a permanent magnet secured to the inwardly disposed end of said mandrel; a valve cage within the other said opening in said tubular housing, said valve cage having a valve seat adjacent its innermost end; and a ball valve engageable with said seat, said magnet tending to maintain said ball valve seated on said valve seat.

2. A vacuum pull regulating valve, comprising: a tubular housing having at least one open end and having diametrically opposed openings in its wall; a valve cage within one said wall opening, said valve cage having a valve seat at its innermost end; a ball valve within said valve cage; a tube connected at one end with said tubular housing around said valve cage and adapted to be connected at its other end to a source of vacuum, said tube having an opening in its wall; a mandrel projecting into said tubular housing through the other said wall opening; and a permanent magnet secured to the inwardly disposed end of said mandrel, said magnet tending to maintain said ball valve seated on said valve seat.

3. A gas pressure regulating valve, comprising: a tubular housing having opposite open ends defining a gas passageway, said housing having diametrically opposed openings in its wall intermediate its ends; a valve cage within one said wall opening, said valve cage having a valve seat adjacent its innermost end; a ball valve within said valve cage; a mandrel within the other said wall opening in said housing; a permanent magnet secured to the innermost end of said mandrel; and means for moving said mandrel toward and away from the innermost end of said valve cage to increase or decrease the bias on said valve tending to hold it to its seat.

4. Structure as specified in claim 3 in which said tubular housing is provided with an outstanding boss surrounding said mandrel and said mandrel is provided with a substantially circumferential extending inclined groove in its outer surface; a pin extending through the wall of said boss and slidably engaged, by its inner end portion, within the groove in said mandrel; and a wheel secured to the outer end of said mandrel for rotating the latter.

5. A vacuum pull regulating valve, comprising: a tubular housing having opposite open ends, one of which is adapted to be connected to a source of pressure, said tubular housing having diametrically opposed openings in its wall intermediate its ends; a valve cage within one said wall opening, said valve cage projecting into said housing and having a valve seat adjacent its innermost end; a ball valve within said valve cage, a portion of said ball valve projecting through said valve seat when said ball valve is seated; a tube connected at one end to said tubular housing around said valve cage and adapted to be connected at its other end to a source of vacuum, said tube having an opening in its wall; a mandrel within the other said wall opening in said tubular housing, said mandrel having a recess in its inner end portion; a permanent magnet secured to said mandrel within and projecting out of the recess toward said ball valve to bias said ball valve toward its seat; and means for moving said magnet toward and away from said ball valve.

6. Structure as specified in claim 5 in which said tubular housing is provided with an outstanding boss surrounding said mandrel and said mandrel is provided with a substantially circumferential extending inclined groove in its outer surface; a pin extending through the wall of said boss and slidably engaged, by its inner end portion, within the groove in said mandrel; and a wheel secured to the outer end of said mandrel for rotating the latter.

References Cited

UNITED STATES PATENTS

| 2,210,555 | 8/1940 | Podolsky | 137—526 X |
| 2,895,676 | 7/1954 | Kraft | 137—597 X |
| 3,105,511 | 10/1963 | Murphy | 251—65 X |
| 3,225,782 | 12/1965 | Begley et al. | 137—528 X |

FOREIGN PATENTS

| 1,069,442 | 2/1954 | France. |
| 356,421 | 9/1961 | Switzerland. |

WILLIAM F. O'DEA, *Primary Examiner.*

D. LAMBERT, *Assistant Examiner.*